United States Patent [19]

Schmidl

[11] 4,414,238

[45] Nov. 8, 1983

[54] LIQUID ELEMENTAL DIET

[75] Inventor: Mary K. Schmidl, Emeryville, Calif.

[73] Assignee: Cutter Laboratories, Inc., Berkeley, Calif.

[21] Appl. No.: 334,278

[22] Filed: Dec. 24, 1981

[51] Int. Cl.³ .......................... A23D 5/00; A23J 3/00; A23L 1/00

[52] U.S. Cl. .................. 426/602; 426/654; 426/656; 426/658; 426/72; 426/74

[58] Field of Search ........... 426/74, 72, 590, 648, 426/654, 656, 602, 605, 658

[56] References Cited

U.S. PATENT DOCUMENTS

| | | | |
|---|---|---|---|
| 2,426,634 | 9/1947 | Melnick | 426/656 X |
| 3,081,296 | 3/1963 | Smith et al. | 426/654 X |
| 3,238,193 | 3/1966 | Tuschhoff et al. | 426/654 |
| 3,443,964 | 5/1969 | Marrota et al. | 426/579 |
| 3,697,287 | 10/1972 | Winitz | 426/656 X |
| 3,846,560 | 11/1974 | Hempenius et al. | 426/656 X |
| 3,950,547 | 4/1976 | Lamar et al. | 426/656 X |
| 4,144,357 | 3/1979 | Mohammed | 426/590 X |
| 4,331,689 | 5/1982 | Shemwell | 426/592 X |

*Primary Examiner*—Robert A. Yoncoskie
*Attorney, Agent, or Firm*—James A. Giblin

[57] ABSTRACT

A ready-to-use liquid elemental diet comprising a nutritionally acceptable combination of carbohydrate, amino acid, and lipid components, the combination having a pH ranging from about 3.0 to 4.4, being non-browning at elevated temperatures, and including, as the lipid component, a stable emulsion comprising a lipid source, an emulsifier and a starch modified with succinic anhydride in quantities sufficient to maintain emulsion stability in the pH range of about 3.0 to 4.4.

2 Claims, No Drawings

LIQUID ELEMENTAL DIET

BACKGROUND OF THE INVENTION

1. Field

This disclosure is concerned with a nutritionally balanced food composition and specifically with a ready-to-use liquid elemental diet which is non-browning at elevated temperatures.

2. Prior Art

Nutritionally balanced diet compositions have been known and available for many years. Typically, such compositions include carbohydrate, protein and lipid components as well as vitamins and minerals. In the case of so-called elemental diet compositions, the protein component may be made available in a nutritionally desirable balance of low molecular weight peptides and/or amino acids. Unfortunately, when amino acids and carbohydrates are combined in an aqueous solution, these components have a tendency, especially with time and at elevated temperatures, to result in a brownish solution and form undesirable by-products due to the well known Maillard reaction(s).

It is well known that this generally undesirable color change (which includes the formation of somewhat toxic melanoidin end products) is associated principally with the pH of the carbohydrate-amino acid solution. The pH controls the chemical state of the reducing end groups of available carbohydrates and the amine groups of the amino acids or peptides. Inhibition of Maillard browning reactions may be accomplished by (1) maintaining the solution pH below the isoelectric points of the amino acids and peptides (e.g. less than about 4.2); (2) keeping the solution temperature as low as possible during processing and storage; and/or (3) by increasing the mean distance between reactants (e.g. a 3.1% solution of amino acids is less likely than a 6.2% solution to form solution browning reaction products with glucose).

In general it has been known that the undesirable products and coloring of the Maillard reactions can be avoided or minimized by maintaining the pH below about 4.5. See, for example, U.S. Pat. No. 4,144,357 which summarizes some of the earlier observations in this area. See also the disclosures in U.s. Pat. No. 2,426,639 showing various ways to assure a low pH while still keeping a food product palatable.

Even though it has been known that the Maillard reaction(s) could be avoided or minimized by maintaining a relatively low pH, it has been difficult for elemental diet manufacturers to provide such diets in a ready-to-use, liquid form because of the known lack of stability of lipid emulsions in the pH range needed to avoid the Maillard reactions. Because of this, until very recently (e.g. the recently announced CRITICARE ready-to-use liquid elemental diet, Mead-Johnson Corp.), manufacturers have provided liquid elemental diets in a dry form, typically in a foil packet which must be mixed with water just prior to use. Aside from the obvious inconvenience of having to mix a dry powder prior to use, it can be appreciated that the very act of mixing raises possibilities of contamination which can be of concern vis-a-vis the environment (i.e. hospital patients) in which liquid elemental diets are often used.

Quite surprisingly, it has been found that stable, heat-sterilizable elemental diet compositions can now be prepared in a liquid form. The product, being ready-to-use, avoids the disadvantages associated with elemental diets in dry form. Details of the discovery are described below.

SUMMARY OF THE INVENTION

The liquid elemental diet composition of this invention comprises an aqueous combination of carbohydrate, amino acid, and lipid components, the combination being at a pH ranging from about 3.0 to about 4.4 and including, as the lipid component, a lipid emulsion stable at the above pH range for prolonged periods of time. The lipid component comprises elemental lipid sources such as: medium chain triglycerides (MCT) or other structural triglycerides, a vegetable oil such as, corn oil, a suitable emulsifier, and a starch-like material in quantities sufficient to maintain a stable emulsion in the pH range of the composition. The lipid component preferably includes a modified starch and the amino acid component includes a nutritionally acceptable balance of amino acids and/or relatively low molecular weight peptides. The aqueous combination of the ingredients comprising this invention is non-browning with time and/or at elevated temperatures and can be pasteurized or sterilized without the formation of Maillard reaction-related by-products or undesirable coloration.

SPECIFIC EMBODIMENTS

The elemental dietary composition of this disclosure includes three major components: amino acids and/or peptides as a nitrogen source (herein referred to as the amino acid component), carbohydrates and lipids. The composition may also contain relatively minor amounts of vitamins and minerals. It should be pointed out that the liquid diet of this disclosure is an elemental diet in which the major components are made available in an "elemental" form which can be readily assimilated and metabolized once ingested. Elemental forms of these components are described below.

As used herein, the term amino acid source includes either or both of selected amino acids or selected peptides as described below.

Amino acids and/or peptides which can be used for the amino acids component are chosen for their solubility and ability to meet specific nutritional needs. The specific combination of amino acids useful for a given application is referred to as an amino acid profile. Examples of applications for specific amino acid profiles include, for example, specific amino acid combinations (or profiles) for short gut syndrome, kidney and liver disfunction, inborn metabolic disorders, special diets for pediatric use, and the like. In general, diets useful for adult nutrition utilize a NER/PER of 2.5 or greater. As used herein, PER refers to the Protein Efficiency Ratio which is a measure of the weight gain of a growing animal divided by protein intake [i.e. PER=weight gain(gm)/protein intake(gm)]. NER refers to Nitrogen Efficiency Ratio [i.e. NER=weight gain(gm)/nitrogen intake(gm)]. Thus, to achieve a diet having a NER/PER of 2.5 or more, one preferred amino acid profile, shown in detail below, follows or imitates the amino acid profile of lactalbumin found in milk.

When low molecular weight peptides are used as the nitrogen source, care must be taken to avoid peptides which have too high a molecular weight as this can result in precipitation, emulsion breakdown and an undesirable brownish product. For example, peptides made from hydrolyzed lactalbumin having the following molecular weight profile should not be used in the liquid elemental diet of this disclosure:

| No. Amino Acid Residues | % |
| --- | --- |
| 1-3 | 50.4 |
| 4-6 | 29.6 |
| 7 and greater | 20.0 |

On the other hand, it has been found that enzymatically derived protein hydrolysates having the following molecular weight profile are especially useful in the liquid elemental diet disclosed herein:

| No. Amino Acid Residues | % |
| --- | --- |
| 1-3 | 77.5 |
| 4-6 | 14.7 |
| 7 and higher | 8.0 |

In general the peptides comprising 7 or more A.A. residues should constitute a relatively small percentage of the total peptides, the 4-6 residue peptides a moderate percentage and the 1-3 residue peptides should constitute the largest percentage of the total. This is particularly true for elemental diets from a medical and nutritional point of view, since free amino acids, dipeptides and tripeptides can also be absorbed by the gut without prior digestion.

The actual total amount of amino acids/peptides in the liquid elemental diet will depend on desired nutritional goals. In general, however, the amino acid/peptide content should be in the range of about 5 to 30% of the total calories of the liquid diet. The amino acid/peptide contribution can be expressed as the nitrogen (N) to calorie ratio and this ratio may range from about 1 to 150 (high nitrogen or HN diet) to 1 to 250 (standard diet). These ratios can be determined by well known means.

The carbohydrate component of the liquid diet may be any edible or FDA approved carbohydrate which is digestible. In general, the carbohydrate contribution, as a percent of total calories in the diet, may range from about 50 to about 90%, the standard amount being in the range of about 60 to 70%. In the elemental diet of this disclosure, a preferred carbohydrate source is maltodextrins or a low molecular weight hydrolyzed corn starch.

The lipid or fat source may be any edible FDA approved natural or synthetic oil or oil combinations. An ideal lipid for an elemental diet should meet the following requirements:

(1) require minimal lipase or bile salts for their absorption, and (2) supply about 15 to 35% of the total calories, with at least about 2.5% of the total calories being supplied by linoleic acid (an essential fatty acid needed to avoid essential fatty acid deficiency).

Very important to the liquid elemental diet of this disclosure is the lipid emulsion system. As noted above, in the past, it had been quite difficult to obtain stability of a lipid emulsion at the ion pH range (about 3 to 4) needed to avoid the consequences of the undesirable Maillard reactions. It has been found that an emulsion stable with time (e.g. no visible "creaming off" layer after 90 days storage) at elevated temperature (e.g. 38° C.) is possible if the emulsion contains both an emulsifier (e.g. one comprising mono and diglycerides in relatively small amounts) and a starch-like material (e.g. a modified starch), the combination of which results in a lipid emulsion which remains stable under the above conditions.

In general, the emulsifier should comprise a mixture of mono and diglycerides to maintain the stability of the emulsion. Stability is enhanced by the inclusion of a modified starch (e.g. "waxy maize" corn starch which has been modified with, for example, succinate anhydride) in amounts of about 2.4% (w/v). It is thought that the modified starch contributes to emulsion stability by reduction of the boundary tension between the two immisible fluids, oil and water. Nonmodified starches (e.g. high amylose corn starch, tapioca starch, waxy maize) were found to be not effective as emulsion stabilizers in the pH range of 3.0 to 4.4.

Succination of a food starch provides additional functionality to the starch and aids emulsifiers in emulsification, encapsulation and coacervation. Therefore, a succinated starch is an especially preferred modified starch for this invention.

The lipids which are emulsified should contribute from 15 to 35% of the total calories and should be balanced to meet a given nutritional goal. One preferred lipid source includes a combination of medium chain triglycerides (MCT) and corn oil in a weight ratio of about 4:1. This insures that there is sufficient linoleic acid present to prevent essential fatty acid deficiency.

A preferred lipid emulsion system is composed of MCT oil, modified starch, corn oil, corn syrup solids, and mono and diglycerides. As pointed out above, the modified starch helps stabilize the emulsion under sterilization conditions required for regulatory approval by being absorbed at the oil-water interface to form a hydrated film.

Emulsion stability

As used herein, the terms stable or stability, when applied to the lipid emulsion of this disclosure refers to a lipid emulsion which is part of the liquid elemental diet of this disclosure and is capable of passing all of the following tests:

(1) there must be no visible break in the emulsion such as a visible oil layer above an aqueous layer;

(2) the emulsion must pass a Red Dye Test in which a fat-soluble dye (Sudan IV) is added to the emulsion. The test is passed if no bright red droplets appear at the surface or sides of the container;

(3) there must be no "creamy layer". "Creamy layer" refers to a combination of fat, water, and other components on the top of an emulsion. If such a layer can be readily seen or measured (with a ruler) in 1 mm of product, the emulsion is not considered stable;

(4) the emulsion must survive a "shaking test" by being agitated slowly at room temperature for 24 hours without showing visible signs of breaking; and (5) the emulsion must survive storage at room temperature and at elevated temperature (38° C.) for three months and then pass tests (1), (2) and (3) above.

Vitamins and minerals may be added to meet the Recommended Daily Allowances or other medically indicated requirements.

Representative amounts of these substances are shown in the table below.

| VITAMINS AND MINERALS | AMOUNTS PER 2000 CALORIES | PERCENTAGE OF U.S. RECOMMENDED DAILY ALLOWANCES (U.S. RDA) |
|---|---|---|
| Vitamin A | 5000 I.U. | 100 |
| Vitamin D | 400 I.U. | 100 |
| Vitamin E | 30 I.U. | 100 |
| Vitamin C | 90 mg. | 150 |
| Folic acid | 0.4 mg. | 100 |
| Thiamine | 1.5 mg. | 100 |
| Riboflavin | 1.7 mg. | 100 |
| Niacin | 20 mg. | 100 |
| Vitamin $B_6$ | 2 mg. | 100 |
| Vitamin $B_{12}$ | 6 mcg. | 100 |
| Biotin | 0.3 mg. | 100 |
| Pantothenic acid | 10 mg. | 100 |
| Calcium | 1.2 g. | 120 |
| Phosphorus | 1.0 g. | 100 |
| Iodine | 150 mcg. | 100 |
| Iron | 18 mg. | 100 |
| Magnesium | 400 mg. | 100 |
| Copper | 2 mg. | 100 |
| Zinc | 15 mg. | 100 |
| Sodium | 1.5 g. | * |
| Manganese | 2.5 mg. | * |
| Potassium | 1.7 g. | * |
| Chloride | 3.4 g. | * |
| Vitamin $K_1$ | 150 mcg. | * |
| Choline | 285 mg. | * |

*U.S. Recommended Daily Allowance (U.S. RDA) has not been established.

The importance of maintaining a pH range of 3.0 to 4.4 in the liquid elemental diet can be seen in the following tables. Table I illustrates the effects of pH on color of the composition as determined using a Hunter Color Difference Meter with the indicated white tile as a desired standard. As can be seen, the desirable white color for the product is adversely affected outside the pH range of about 3.0 to 4.4. As noted above, in addition to the undesirable color changes, there are also formed undesirable by-products of the Maillard reactions known as melanoidins (which can be toxic).

TABLE I

Hunter Color Difference Meter Reading pH vs. Color Change

| | L* | a* | b* |
|---|---|---|---|
| *Liquid Elemental Diet Made With Amino Acids* | | | |
| pH 2 | +38.4 | −1.9 | +12.8 |
| pH 3 | +69.9 | −3.7 | +9.5 |
| pH 4 | +58.4 | −2.8 | +9.2 |
| pH 5 | +47.4 | +0.1 | +17.2 |
| pH 6 | +39.0 | +6.7 | +20.4 |
| pH 7 | +28.8 | +11.2 | +15.9 |
| pH 9 | +11.6 | +10.8 | +6.2 |
| *Liquid Elemental Diet Made With Peptides* | | | |
| pH 2 | +26.6 | +3.3 | +11.2 |
| pH 3 | +60.5 | −0.6 | +11.5 |
| pH 4 | +62.7 | −1.2 | +11.0 |
| pH 5 | +57.3 | +0.1 | +10.9 |
| pH 6 | +58.5 | +0.2 | +12.0 |
| pH 7.00 | +55.0 | +0.9 | +13.6 |
| pH 9.00 | +30.8 | +9.7 | +15.9 |
| White Tile (std #3028) | L = 95.41 a = −0.6 b = +0.4 | | |

*Items L, a and b represent reference values for measures of black-white, green-red and blue-yellow according to the following system:
L = 0(Black)−100(White)
a = −80(Green)−+100(Red)
b = −50(Blue)−+70(Yellow)

The effects of pH on a preferred amino acid profile for the elemental diet of this disclosure are shown in Table II. As can be seen, in some cases (e.g. extreme pH of 9.0) the amounts of certain amino acids present at pH 4.0 are significantly diminished.

TABLE II

Comparison of Liquid Elemental Diet Amino Acid Profile at Various pH's (Before and After Sterilization)

| | | Un- | Sterilized (250° F., 15 min.) | | | |
|---|---|---|---|---|---|---|
| Amino Acids | Amounts (%/wt) Theoretical % | Sterilized % | pH 2.0 % | pH 4.0 % | pH 7.0 % | pH 9.0 % |
| Histidine | 2.10 | 2.14 | 2.36 | 2.08 | 1.57 | 0.67 |
| Isoleucine | 5.24 | 5.40 | 5.84 | 5.31 | 5.17 | 5.92 |
| Leucine | 11.93 | 12.07 | 13.30 | 12.04 | 11.67 | 12.71 |
| Lysine | 9.76 | 9.93 | 10.71 | 9.44 | 8.39 | 5.66 |
| Methionine | 2.31 | 2.44 | 2.59 | 2.32 | 2.06 | 2.20 |
| Phenylalanine | 4.12 | 4.16 | 4.93 | 4.43 | 4.18 | 4.27 |
| Threonine | 5.11 | 5.08 | 5.70 | 5.25 | 4.89 | 4.67 |
| Tryptophan | 1.16 | * | * | * | * | * |
| Valine | 5.27 | 5.20 | 5.86 | 5.34 | 5.20 | 5.91 |
| Alanine | 5.60 | 5.63 | 6.24 | 5.74 | 5.55 | 6.08 |
| Arginine | 3.27 | 2.25 | 3.65 | 3.29 | 2.83 | 1.91 |
| Aspartic Acid | 10.64 | 10.87 | 12.11 | 11.06 | 10.90 | 12.65 |
| Cysteine | 1.16 | * | * | * | * | * |
| Glutamic Acid | 17.16 | 17.79 | 8.63 | 12.08 | 16.31 | 18.08 |
| Glycine | 2.16 | 2.16 | 2.42 | 2.23 | 2.04 | 1.61 |
| Proline | 4.94 | 5.72 | 5.70 | 5.23 | 5.13 | 6.29 |
| Serine | 4.05 | 4.10 | 4.61 | 4.20 | 4.00 | 4.03 |
| Tyrosine | 3.94 | 4.05 | 4.59 | 4.20 | 3.90 | 4.10 |

*not determined.

EXAMPLE

The preferred standard liquid elemental diet for this invention has the composition shown in Table III.

TABLE III 22.0% Total Solids (w/w)
(Specific Gravity - 1.079)

| | Weight Per 2,000 Calories |
|---|---|
| Water (deionized, tap or softened) | 1680 grams |
| Corn Syrup Solids DE 10 (5% $H_2O$) | 293.52 grams |
| Modified Starch (6% $H_2O$) | 51.23 grams |
| MCT Oil | 39.11 grams |

TABLE III-continued 22.0% Total Solids (w/w)
(Specific Gravity - 1.079)

| | Weight Per 2,000 Calories |
|---|---|
| Potassium Gluconate | 12.0 grams |
| L-Glutamic Acid | 10.81 grams |
| Corn Oil | 9.78 grams |
| Magnesium Gluconate .2H$_2$O | 8.92 (7.72) grams |
| L-Lysine Acetate | 8.61 grams |
| Calcium Glycerophosphate | 7.55 grams |
| L-Leucine | 7.52 grams |
| L-Aspartic Acid | 6.70 grams |
| Sodium Chloride | 3.81 grams |
| L-Alanine | 3.53 grams |
| L-Tyrosine Ethylester Hydrochloride | 3.36 grams |
| L-Valine | 3.32 grams |
| L-Isoleucine | 3.31 grams |
| L-Threonine | 3.22 grams |
| L-Proline | 3.11 grams |
| L-Phenylalanine | 2.60 grams |
| L-Serine | 2.56 grams |
| L-Arginine (free base) | 2.06 grams |
| L-Methionine | 1.46 grams |
| Glycine | 1.36 grams |
| L-Histidine | 1.34 grams |
| Choline Bitartrate | 1.094 grams |
| Mono and diglycerides | 0.73 grams |
| L-Cysteine (free base) | 0.73 grams |
| L-Tryptophan | 0.73 grams |
| Sodium Ascorbate (C = 88%) | 306.8 mg |
| Ferrous Gluconate .2H$_2$O | 186.48 mg |
| Mixed Tocopherols | 102.69 mg |
| Dipotassium Phosphate | 163.0 mg |
| Dl-alpha-Tocopherol Acetate (500 I.U./g) | 90.00 mg |
| Zinc Acetate .2H$_2$O | 60.40 mg |
| Niacinamide | 30.00 mg |
| Vitamin A Palmitate (250,000 I.U./g) | 30.00 mg |
| Manganese Gluconate .3H$_2$O | 27.27 mg |
| Cupric Gluconate | 17.16 mg |
| D-Calcium Pantothenate (Ca = 8.41%) | 16.38 mg |
| Pyridoxine HCl (B$_6$ = 76.88%) | 4.00 mg |
| Riboflavin | 3.06 mg |
| Thiamine Mononitrate | 2.81 mg |
| Folic Acid | 720 mcg |
| Biotin | 540 mcg |
| Vitamin D$_3$ (1,000,000 I.U./g) | 480 mcg |
| Vitamin K$_1$$^3$ (phytonadione) S.D. 1% (270 mcg of K$_1$) | 27.00 mg |
| Potassium Iodide | 235.40 mcg |
| Cobalamin Concentrate (0.1%) (10.8 mcg of B$_{12}$) | 10.80 mg |
| Hydrochloric Acid for pH adjustment (37% w/v) | 2.76 grams |
| Phosphoric Acid for pH adjustment (85% w/v) | 1.55 grams |

The product can be prepared as follows:

Processing Procedure for Liquid Elemental Diet

I. Weighing Procedure

All dry ingredients should be weighed out not more than 24 hours prior to processing of liquid elemental diet.

A. Weigh out hydrolyzed cornstarch (Fro-Dex 10) into a plastic bag and set aside.
B. Weigh out the modified starch into a plastic bag and set aside.
C. Weigh out and mix the amino acids in the following order by geometric dilution:
L-Tryptophan, L-Cystein, L-Histidine, Glycine, L-Methionine, L-Arginine (free base), L-Tyrosine ethylester Hydrochloride, L-Serine, L-Phenylalanine, L-Proline, L-Threonine, L-Isoleucine, L-Valine, L-Alanine, L-Aspartic Acid, L-Leucine, L-Lysine Acetate and L-Glutamic Acid. Set amino acid mix aside.
D. Weigh out the remainder of the minerals consisting of sodium chloride, calcium glyceophosphate, potassium gluconate and magnesium gluconate and set aside.
E. Weigh out the following micro minerals consisting of Potassium Iodide, Cupric gluconate, Manganese gluconate.3H$_2$O, Zinc Acetate.2H$_2$O, Ferrous gluconate.2H$_2$O, Dipotassium phosphate and set aside in a covered container.
F. Weigh out choline Bitartnate and pour into a separate covered container.
G. Weigh out HCl and phosphoric acid.
H. Weigh out and combine corn oil and MCT oil into a container to which is added the emulsifier (mono and diglycerides) and the fat soluble vitamins Vitamin D$_3$ (1,000,000 I.U./gram), Vitamin K$_1$, (phytonadione) 1% S.D., Vitamin A Palmitate (250,000 I.U./gram) and Vitamin dl-alpha-Tocopherol Acetate (500 I.U./gram) oil blend.
I. Weigh out the water soluble vitamins in the following manner:
Weigh out and combine in a single covered container the Biotin, Folic Acid, Thiamine Mononitrate, Riboflavin, Pyridoxine HCl, Cobalamin Concentrate (0.1%), D-Calcium Pantothenate, Niacinamide, and Sodium Ascorbate. Set vitamin mix aside.
J. Weigh out proper amount of hot (60° C.) deionized water and pour into a stainless steel electric kettle. (Amount added is slightly less than formula requires. Solids content is adjusted at the end of the process.) Reserve a small amount of water to dilute the micro mineral mix and water soluble vitamin mix.

II. Mixing Procedure

A. Dissolve hydrolyzed cornstarch (Fro-Dex 10) (IA) and modified starch (IB) in the deionized water. Heat mixture to 70° C., while stirring constantly.
B. After the hydrolyzed cornstarch (Fro-Dex 10) and starch have completely dissolved, add the amino acid mix (IC) all at once and stir. Next add the dry mineral mix diluted micro mineral mix and choline Bitartrate (ID, IE, IF) and stir until dissolved. Bring the temperature up to 87.5° C. and hold for 5 minutes. This liquid diet should be stirred constantly and splashing should be minimized. pH is approximately 4.0 (hot). Add HCl and phosphoric acid (IG).
C. In a separate container heat the oil mixture (IH) until the emulsifiers and vitamins dissolve (60° C.).

III. Homogenization Procedure

A. Prior to sample homogenization, thoroughly mix oil blend with the carbohydrate/amino acid/mineral solution and choline bitartrate.
B. Homogenize one time with double stage homogenization, using a total pressure 3000 psi with 500 psi for the second stage. Pass the sample through a preheater set at 70° C. prior to being homogenized and a chiller (4° C.) immediately following homogenization. Add the water soluble vitamins (IT) and mix well.
C. Determine the % solids. Add more water if necessary. Solids should be about 22%.

IV. Filling Procedure

A. Fill 8 fluid once cans or glass bottles with 259 grams of liquid diet.
B. Seam can with 15 inches of vacuum, or cap bottles.

V. The general sterilization procedures are those recommended by the FDA for high acid foods:
   A. The maximum amount of time and temperature is 4 to 5 minutes at about 100° C.; or
   B. Fill cans hot and hold for 2 minutes at 88° C. and then allow to cool; or
   C. Pass through a steritort to give a sterilization procedure similar to A. above.
VI. Alternatively the product can be packaged in a flexible packaging system, such as a plastic container or retortable pouch. A plastic container with a port fitment attached would eliminate the need of transferring the canned product to a plastic gavage bag for nasogastric feeding. A retortable pouch (FDA approved) has been found to be very acceptable. Preliminary results also indicate that plastic laminate composed of polyvinylidene chloride (0.6 mil), oriented Nylon (0.6 mil), ethyl vinyl alcohol, and polyethylene is very acceptable. Examples of unacceptable plastics are (1) 2.5 mil Saron polyester Saron with 1 mil 4% ethylvinyl alcohol/Polyester, (2) Low linear density polyester.

It should be understood that the above Example is merely illustrative of the invention being disclosed herein. Given this disclosure, variations will occur to those skilled in the art. Accordingly, it is intended that the invention being disclosed herein should be limited only by the following claims.

I claim:

1. A ready-to-use aqueous elemental diet composition comprising, based on the total calories of the composition, a carbohydrate component ranging in amount from about 50 to 90%, an amino acid component ranging in amount from about 5 to 30%, and a lipid component ranging in amount from 10 to 50%, the composition being non-browning at 38° C., having a pH ranging from about 3.0 to about 4.4 and having the lipid component in the form of a stable emulsion consisting of lipids, an emulsifier selected from the group consisting of mono and diglycerides and a corn starch modified with succinate anhydride in quantities sufficient to maintain emulsion stability in the pH range of about 3.0 to 4.4.

2. The composition of claim 1 wherein the amino acid component comprises either pure L-amino acids or about 77.5 weight % of compounds having 1–3 amino acid residues, about 14.7 weight % of compounds having 4–6 amino acid residues, and about 8 weight % of compounds having 7 or more amino acid residues.

* * * * *